United States Patent
Chan et al.

(10) Patent No.: US 9,793,022 B1
(45) Date of Patent: Oct. 17, 2017

(54) METHOD OF DECONTAMINATION FOR A HIGH ACTIVITY NUCLEAR WASTE POLLUTED STORAGE CANISTER

(71) Applicants: Chi-Ta Chan, Taoyuan (TW);
An-Ching Liao, Taoyuan (TW);
Chen-Fa Lan, Taoyuan (TW)

(72) Inventors: Chi-Ta Chan, Taoyuan (TW);
An-Ching Liao, Taoyuan (TW);
Chen-Fa Lan, Taoyuan (TW)

(73) Assignee: INSTITUTE OF NUCLEAR ENERGY RESEARCH, Jiaan Village, Longtan, Taoyuan (TW)

( * ) Notice: Subject to any disclaimer, the term of this patent is extended or adjusted under 35 U.S.C. 154(b) by 0 days.

(21) Appl. No.: 15/289,213

(22) Filed: Oct. 10, 2016

(51) Int. Cl.
| | |
|---|---|
| A61L 2/02 | (2006.01) |
| G21F 9/00 | (2006.01) |
| G21F 9/02 | (2006.01) |
| G21F 9/30 | (2006.01) |
| G21F 5/12 | (2006.01) |
| B01D 46/00 | (2006.01) |
| G01T 1/02 | (2006.01) |

(52) U.S. Cl.
CPC ......... *G21F 9/005* (2013.01); *B01D 46/0041* (2013.01); *B01D 46/0094* (2013.01); *G01T 1/02* (2013.01); *G21F 5/12* (2013.01); *G21F 9/02* (2013.01); *G21F 9/30* (2013.01); *B01D 2271/02* (2013.01); *B01D 2279/35* (2013.01); *G21Y 2002/10* (2013.01); *G21Y 2002/50* (2013.01); *G21Y 2004/501* (2013.01)

(58) Field of Classification Search
CPC .... B01D 46/0041; B01D 46/0094; A61L 2/00
See application file for complete search history.

(56) References Cited

U.S. PATENT DOCUMENTS

| | | | | |
|---|---|---|---|---|
| 4,334,900 A | * | 6/1982 | Neumann | B01D 46/0023 376/313 |
| 4,710,318 A | * | 12/1987 | Horiuchi | G21F 9/302 264/0.5 |
| 5,767,422 A | * | 6/1998 | Brassell | B09B 1/00 73/864.74 |

* cited by examiner

*Primary Examiner* — Sean E Conley

(57) ABSTRACT

A method of follow-up decontamination operation for the polluted storage canister of a high activity nuclear waste storage facility, using needle and steel brushes driven by pneumatic tools for abrading the bottom and the inner wall of the storage canister to remove contaminants, a multi-level filter system for air filtration and removing pollutants in the storage canister, and a cover to be used in association with the pneumatic tools and the multi-level filtration system suitable to cap the storage canister, thus effectively block the exposure of contaminant of the storage canister to the external environment, achieving effective decontamination of the radioactive waste and reducing spreading to the environment.

6 Claims, 6 Drawing Sheets

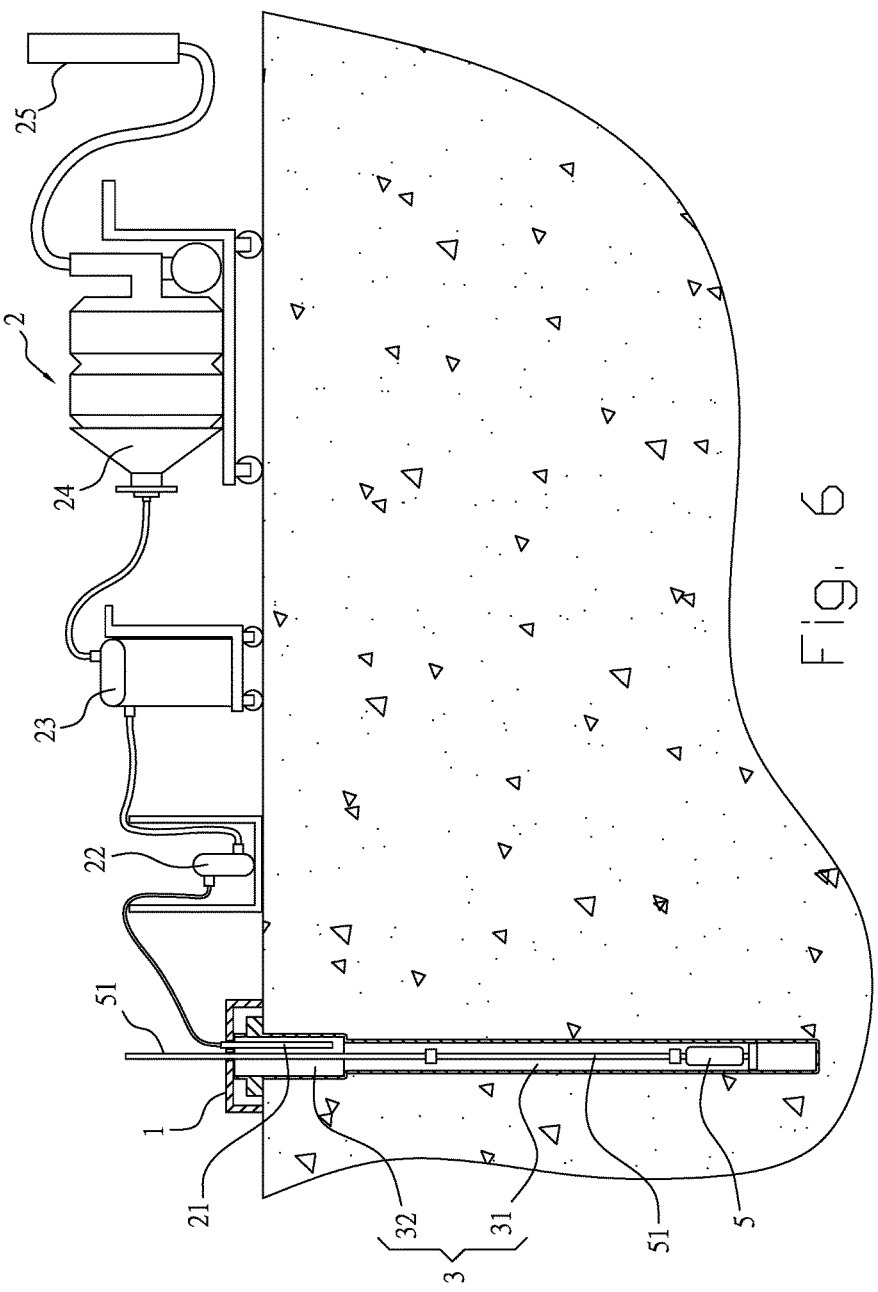

METHOD OF DECONTAMINATION FOR A HIGH ACTIVITY NUCLEAR WASTE POLLUTED STORAGE CANISTER

BACKGROUND OF THE INVENTION

1. Field of the Invention

The present invention relates to a method of decontamination for high activity nuclear polluted canisters, in particular to an interior decontamination featuring simplicity, low cost, and effectively preventing secondary spread of nuclear waste contamination.

2. Description of Related Art

After the storage canister removed from the high-activity nuclear waste storage facility, it is harmful to the workers in a subsequent nuclear facility decommissioning process due to high activity radioactive residues still remains. Therefore, it is required to comply with the ALARA regulation and consider reducing workers' exposure to environmental pollution in prior to high activity nuclear facility decommissioning operations. The decontamination operations of storage canisters shall be conducted to reduce degree of environmental pollution and the intensity of radiation to avoid air contamination and vivo pollution.

In a conventional way, the decontamination of a storage canister includes clearing contaminants adhered to the wall, the bottleneck, and the bottom of the storage canister, minimizing the radiation intensity of the storage canister and completing the collection of pollutants to reduce the volume of radioactive contamination and secondary pollution to environment. The conventional way to use dry ice as a sand material for blasting contaminants and after completion of abrading to remove contaminants off the nuclear waste storage canister for clearing, thus it can effectively reduce the generation of secondary waste pollution, however, there are many limitations of dry ice blasting technology, such as lack of hardness of the sand material made of dry ice that it became less effect when applied for the decontamination of steel storage facility. Furthermore, the dry ice blasting equipment is expensive and bulky in size, difficult for preservation and confining working area, and difficult to control air pollution. Especially, the air pollution spread problem is seemed to be unavoidable when using high-pressure air for blasting decontamination operation.

To overcome the shortcomings, the present invention tends to provide an improved method for interior decontamination for high activity polluted storage canisters to mitigate and obviate the aforementioned problems.

SUMMARY OF THE INVENTION

The primary object of the present invention is to provide a decontamination method for a high activity nuclear polluted storage canister, using pneumatic tools to drive steel needle brushes to remove pollutants, and it takes advantage of the lower pressure required for using pneumatic tools than that of using a dry ice blasting equipment, and work time is shorter as well. In association with an airtight cover plate, it is capable to collect radioactive pollutants in a confined storage canister to avoid work environment airborne pollution, and the use of multi-level filtration system that ensures the filtration treatment can effectively reduce the possibility of airborne contamination, therefore, the effect of the diffusion of airborne pollution by a radioactive waste storage canister is less significant, and the protection of radioactive contamination is easier to handle, and the higher efficiency of collection of radioactive pollutants than that of the dry ice blasting is more effective to prevent the secondary spread of radioactive contamination from taking place.

Another object of the present invention is to provide a decontamination method for a high activity nuclear polluted storage canister, using a grinder pneumatic tool that has a high efficiency of blasting contamination, especially with a steel needle and brush for blasting metal corrosion and adherent pollutant with significant effect. Moreover, decontamination effect of using steel brush and needle brush provides better uniform distribution than that of dry ice blasting. In addition, in comparison with the general terms of power tool, lighter weight of pneumatic tool facilitates in convenience for manual operation and the operating temperature is low, while more pneumatic tools can be used with a lift control mechanism for semi-automatic operation, reducing personnel operation time on the job site and effectively minimizing exposure to radiation doses.

Another object of the present invention is to provide a decontamination method for a high activity nuclear polluted storage canister, using existing pneumatic tools with a simple modification to achieve a lower cost and cheaper material supply in comparison with the use of dry ice blasting system with expensive equipments.

To achieve mentioned above purposes, the decontamination method of the present invention comprises the steps of: S11 "building a cover plate to replace the original sealing cover on the storage canister", S12 "recording radiation intensity before decontamination", S13 "building a multiple level filtration system", S14 "removing air pollution the first time", S15 "abrading pollutants at the bottom", S16 "sucking contaminants at the bottom", S17 "removing air pollutant the second time", S18 "replacing the cover plate with the original sealing cover", S19 "assembling the cover plate with a vertical type pneumatic sand wheel, then replacing the original sealing cover to seal the storage canister", S20 "combining the multi-level filtration system and the cover plate", S21 "starting the vertical type pneumatic sand wheel tool and abrading the wall pollutant on the storage canister, and absorbing airborne pollution with the multi-level filtration system at the same time", S22 "absorbing air pollutant the third time when abrading operation on the storage canister wall is completed", S23 "sucking and collecting the wall pollutant off the storage canister", S24 "checking the radiation intensity after decontamination is completed, whether it meets a target value", and S25 "replacing the original cover plate with the original sealing cover".

Another object of the present invention is to provide a decontamination method in which the steps "removing airborne pollutant the first time", "removing airborne pollutant the second time" and "combining the multi-level filtration system and the cover plate" exploit the multi-level filtration system and extend the suction pipe to the bottom of the upper section of the storage canister.

According to the structure mentioned above, in which the "removing airborne pollutant the second time" step sucking the airborne pollutant with a suction pipe at least 10 minutes.

According to the structure mentioned above, in prior to performing assembling the cover plate with a vertical type pneumatic sand wheel, replacing the original sealing cover with the cover plate to seal the storage canister, it is required to replace the cover plate with the original sealing cover, thus preventing the removed pollutant resided at the bottom of the storage canister from diffusing to the environment before the assembly of the cover plate with the vertical type pneumatic abrasion tool is available According to the above mentioned structure, when the "abrading the pollutant at the bottom of the storage canister"

step is completed, then in the process of removal of the pneumatic needle brush tool out of the cover plate, the pneumatic brush tool needs to be shielded without scattering the pollutant to the environment.

According to the above structure mentioned above, in the "after the canister wall decontamination abrading is completed, proceeding to the third time to remove airborne pollution" step, during in the process of removal of the straight type pneumatic abrasion tool out of the storage canister, the pneumatic abrasion tool needs to be shielded without scattering the pollutant to the environment.

Other objects, advantages and novel features of the invention will become more apparent from the following detailed description when taken in conjunction with the accompanying drawings.

BRIEF DESCRIPTION OF THE DRAWINGS

FIG. 6 is a schematic view of abrading operation for the contaminants adhered to the canister wall of the present invention.

DETAILED DESCRIPTION OF THE PREFERRED EMBODIMENTS

Figure 1:
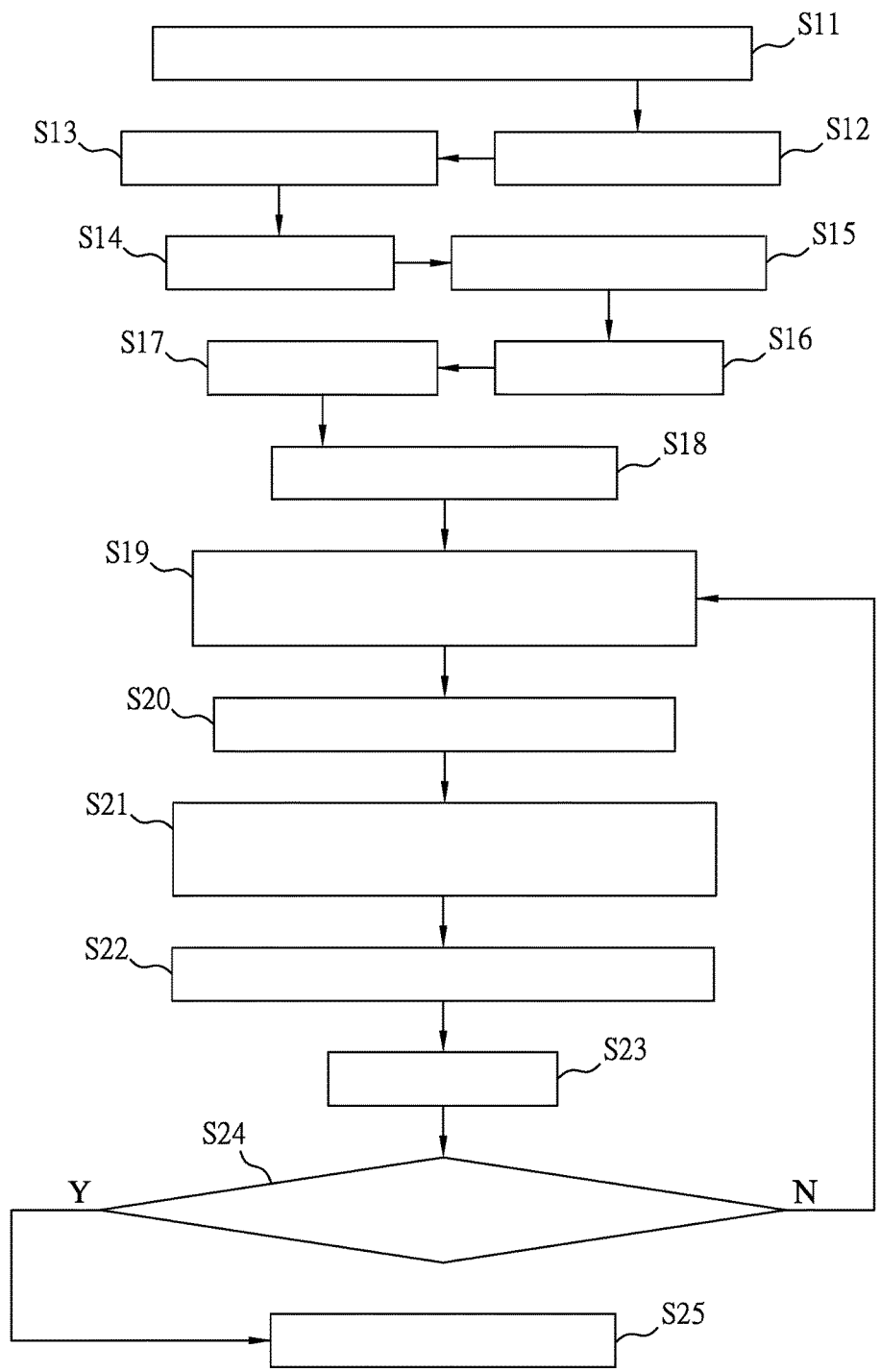
FIG. 1 is a system flow chart of the method of decontamination of the present invention.
Figure 2:
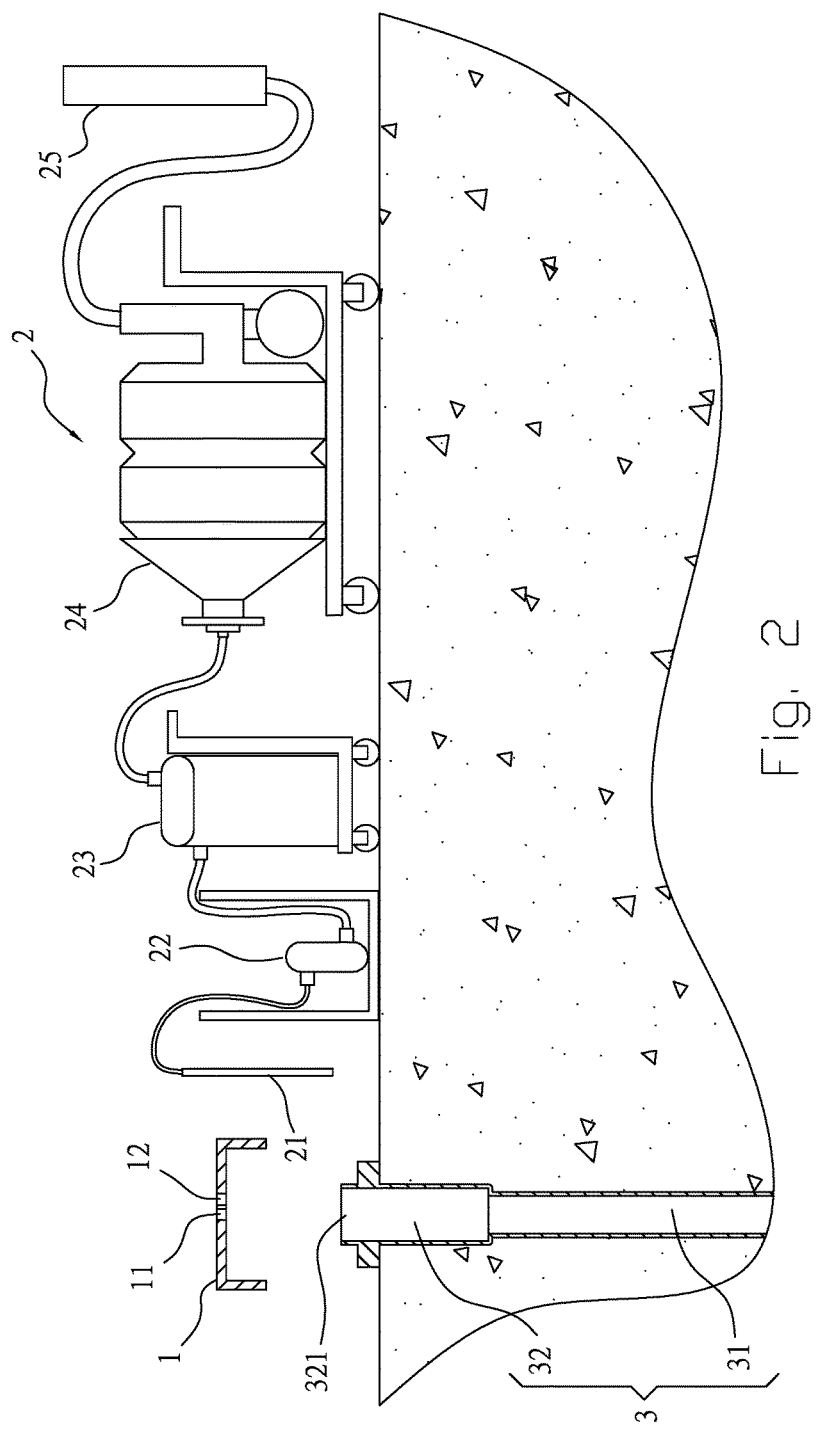
FIG. 2 is the basic structure of the cover plate and the multi-level filtration system of the present invention.
Figure 3:
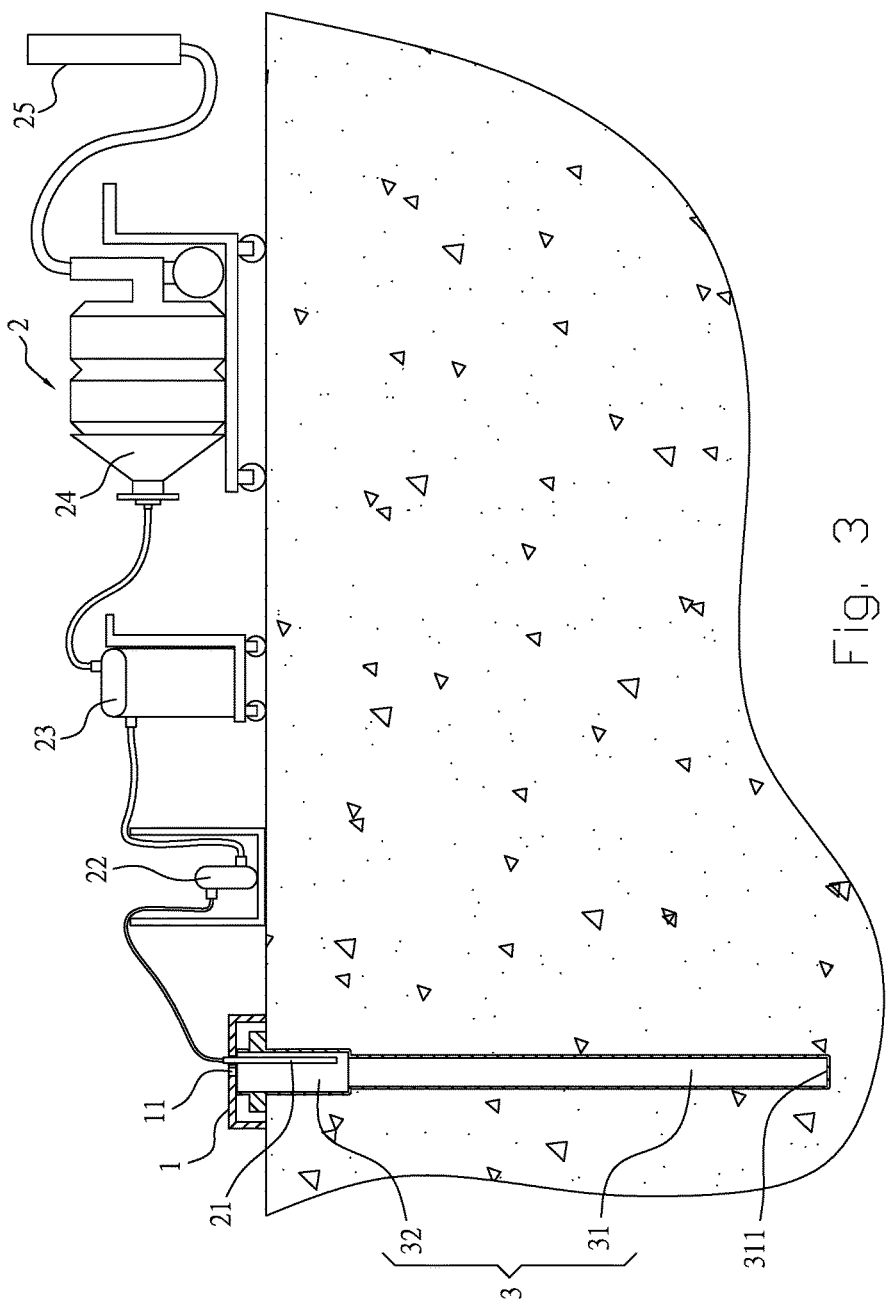
FIG. 3 is a schematic view of the state of removal of the air pollution of the present invention.
Figure 4:
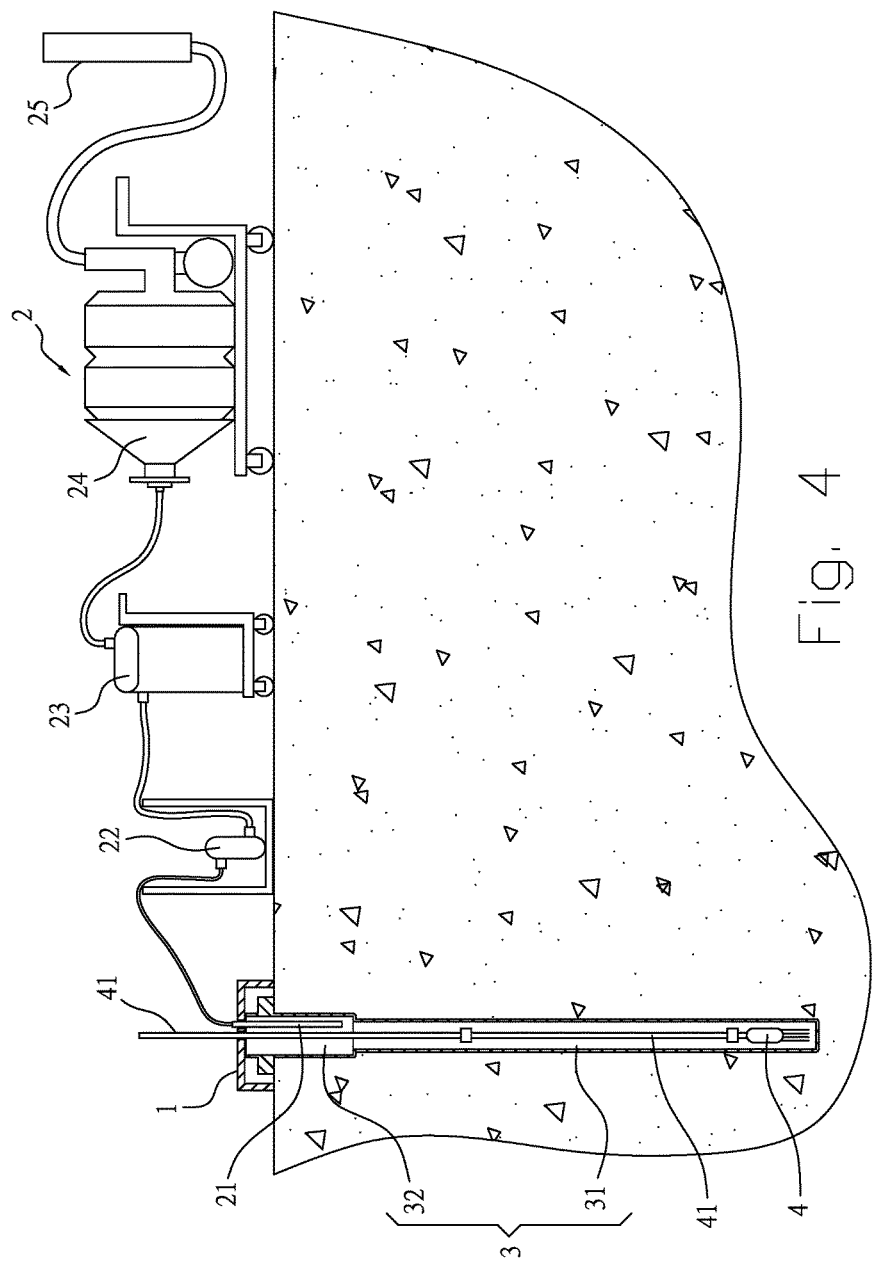
FIG. 4 is a schematic view of abrading contaminants at the bottom of the storage canister of the present invention.
Figure 5:
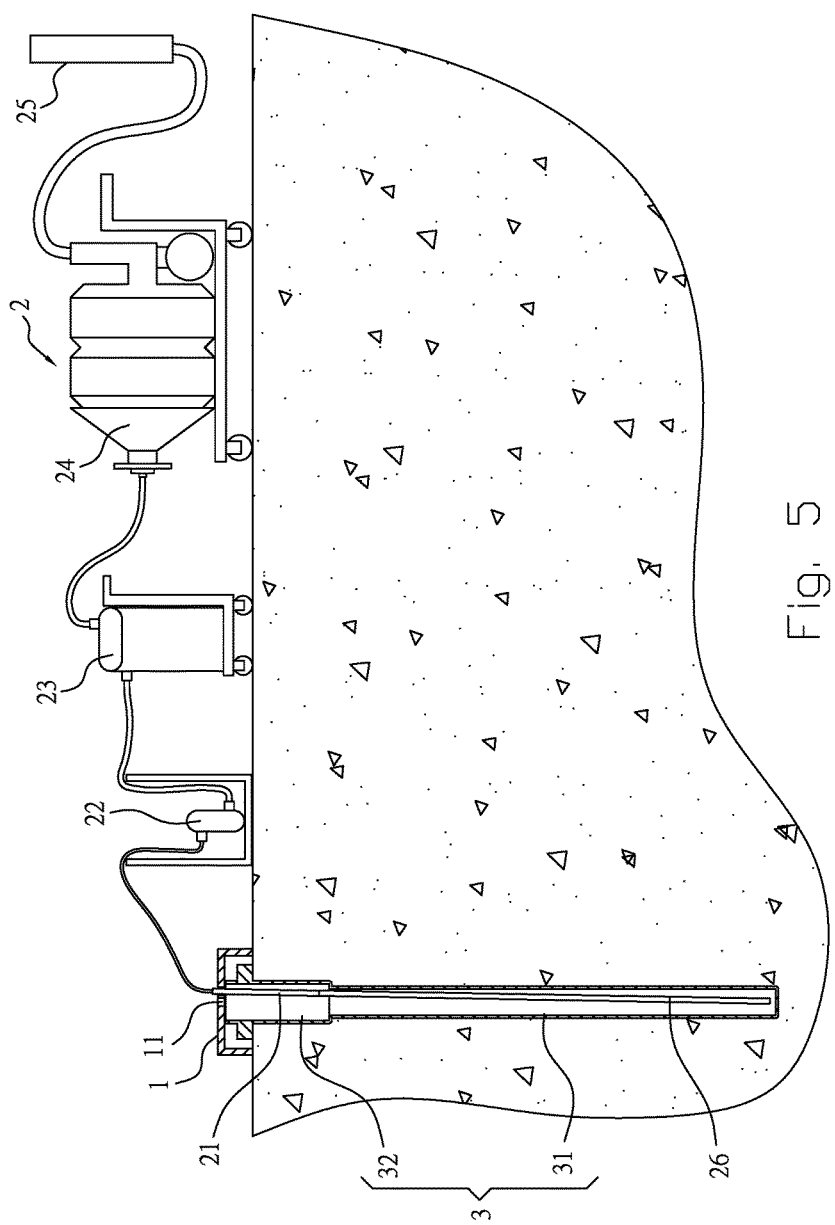
FIG. 5 is a schematic view of sucking contaminants of the present invention.

Referring to the FIG. 1, the decontamination method of the present invention comprises the steps of: S11 "building a cover plate to replace the original sealing cover on the storage canister", 312 "recording radiation intensity before decontamination", 313 "building a multiple level filtration system", 314 "removing air pollutants the first time", 315 "abrading pollutants at the bottom", S16 "sucking contaminants at the bottom", S17 "removing air pollutant the second time", 318 "replacing the cover plate with the original sealing cover", S19 "assembling the cover plate with a vertical type pneumatic sand wheel, then replacing the original sealing cover to seal the storage canister", S20 "combining the multi-level filtration system and the cover plate", S21 "starting the vertical type pneumatic sand wheel tool and abrading the wall pollutant on the storage canister, and absorbing airborne pollution with the multi-level filtration system at the same time", S22 "absorbing air pollutant the third time when abrading operation on the storage canister wall is completed", S23 "sucking and collecting the pollutant off the wall of the storage canister", S24 "checking the radiation intensity after decontamination is completed, whether it meets a target value", and S25 "replacing the original cover plate with the original sealing cover".

Referring to figures from FIG. 2 to FIG. 6, in the step S11, a cover plate 1 having a tool insertion aperture 11 and a suction tube insertion aperture 12 is provided, and the cover plate 1 replaces the original sealing cover on an opening 321 of the storage canister 3. The storage canister 3 is composed of a smaller diameter lower section 31 and a larger diameter upper section 32 forming the storage canister 3, and a base 311 is formed on the bottom side of the lower section 31, and on top of the upper section 32 is formed the opening 321, and the cover plate 1 is placed on the opening 321, and the tool insertion aperture 11 and the suction tube insertion aperture 12 are in communication with the upper section 32.

In the step S12, recording radiation intensity inside the storage canister 3 with a radiation detection equipment before a decontamination work to be carried out.

In the step S13, in a preferred embodiment of the present invention, building a multiple level filtration system 2, consisting of a pre-filtration tank 22, a cleaner 23 (an industrial vacuum cleaner is preferred), an air filtration device 24, and a negative pressure exhaust means 25 sequentially connected in a line, and a suction tube 21 is provided to the front end of the pre-filtration tank 22 for sucking pollutants 21.

In the step S14, passing the suction tube 21 of the multi-level filtration system 2 through the suction tube insertion aperture 12 on the cover plate 1 into the storage canister 3 and extending to the bottom side of the upper section 32 (in a depth of about 80 cm), and turn on the multi-level filtration system 2, the airborne contaminants within the storage canister 3 being sucked into the suction pre-filtration tank 22 via the suction tube 21, and the most air pollutants being collected in the pre-filtration tank 22 and then the air pollutants are filtered and discharged outwardly through the vacuum cleaner 23, the air filtration device 24, and the negative pressure exhaust means 25.

In the step S15, passing an extension rod 41 through the tool insertion aperture 11 of the cover plate 1 into the bottom side of the storage canister 3, and a pneumatic needle brush tool 4 is fixed to the front end of the extension rod 41 for abrading contaminants at the bottom side 311 of the storage canister, and the pneumatic needle brush tool 4 is removed out of the cover plate 1 when the decontamination work is completed, wherein the pneumatic needle brush tool 4 is shielded to avoid scattering the radiation material.

In the step S16, passing a suction tube 21 being connected with a sufficient length extension tube 26 through the tube insertion aperture 12 on the cover plate 1 into the bottom side 311 of the storage canister 3, sucking the contaminants previously removed by the pneumatic needle brush tool 4.

In the step S17, the suction tube 21 of the multi-level filtration system 21 extending to the bottom of the upper section 32 of the storage canister 3 (in a depth of about 80 cm) and pumping at least 10 minutes for cleaning airborne contamination in the storage canister 3.

In the step S18, replacing the cover plate 1 with the original sealing cover after contaminants removal is completed at the bottom side 311 of the storage canister 3 to avoid contamination spreading out.

In the step S19, passing an extension rod 51 through the tool insertion aperture 11 of the cover plate 1 into the bottom side of the storage canister 3, and a vertical pneumatic sand wheel tool 5 is fixed to the front end of the extension rod 51, then replacing the original sealing cover with the cover plate 1 to mount on the storage canister 3. In one embodiment, the extension rod 51 may be configured with a mechanism operable to move the extension rod 51 up and down, enabling the vertical pneumatic sand wheel tool 5 to be displaced up and down in accordance with the movement of the extension rod 51.

In the step S20, passing the suction tube 21 of the multi-level filtration system 2 through the suction tube insertion aperture 12 on the cover plate 1 into the bottom of the upper section 32 of the storage canister 3 (in a depth of about 80 cm).

In the step S21, starting the vertical type pneumatic sand wheel tool 5 and abrading in axial direction to remove pollutants adhered on the inner wall in the lower section 31 of the storage canister 3, absorbing airborne pollutants with the suction tube 21 of the multi-level filtration system 2 at the same time, and collecting pollutants in the pre-filtration tank 22.

In the step S22, after the work of abrading pollutants adhered on the wall of the storage canister 3 is completed, shielding the vertical type pneumatic sand wheel tool 5 while moving out the vertical type pneumatic sand wheel tool 5 from the storage canister 3 to avoid radiation material scattering, and continuously absorbing airborne pollutants with the suction tube 21 of the multi-level filtration system 2 and collecting pollutants in the pre-filtration tank 22.

In the step S23, connecting the suction tube 21 of the multi-level filtration system 2 to an extension tube 26 with a sufficient length and extending into the bottom side of the lower section 31 of the storage canister 3 through a suction tube insertion aperture 12, sucking the previously removed pollutants by the vertical pneumatic sand wheel tool 5.

In the step 24, after completion of decontamination operation, removing the suction tube 21 out of the cover plate 1, and using radiation detection equipment to detect radiation intensity inside the storage canister 3, if the result is negative "N", it means that after the decontamination operation the radiation dose is still exceeding a predetermined target value, then repeating the steps from step S19 again, and if the result is affirmative "Y", it means that after decontamination operation the radiation dose has met the predetermined target value, then proceeds to the next step.

Finally, in the step 25, after the decontamination operation is completed and the radiation intensity detection is in compliance with the target value, then removing the cover plate 1 and replaced with the original sealing cover to seal the opening of the storage canister 3.

Based on the above described high activity holes pollution decontamination method of the present invention can indeed achieve easy operation, reduce costs, improve decontamination effect and prevent the proliferation of secondary pollutants and other effects, in fact, a novel and progressive the creation, Yuan filed patent law; but the contents of the above description, only the preferred embodiment of the present invention are described, under this change covered the technical means and the extension of the scope of the invention, a modified, altered, or replaced by an equivalent, Beijing and Taipei should fall within the scope of the patent application of the present invention.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of decontamination operation for a high activity nuclear waste polluted storage canister, comprising steps:
    1) providing a cover plate having a tool insertion aperture and a suction tube insertion aperture, replacing an original sealing cover with a cover plate on an opening of the storage canister,
    2) recording a radiation intensity inside the storage canister with a radiation detection equipment before a decontamination work to be carried out,
    3) building a multiple level filtration system, consisting of a pre-filtration tank, a cleaner, an air filtration device, and a negative pressure exhaust means sequentially connected in a line, and a suction tube is provided to the front end of the pre-filtration tank for sucking pollutants,
    4) passing the suction tube of the multi-level filtration system through the suction tube insertion aperture on the cover plate into the storage canister and extending to the bottom side of an upper section, and turn on the multi-level filtration system, sucking-airborne contaminants within the storage canister into the pre-filtration tank via the suction tube,
    5) passing an extension rod through the tool insertion aperture of the cover plate into the bottom side of the storage canister, and a pneumatic needle brush tool is fixed to the front end of the extension rod for abrading contaminants at the bottom side of the storage canister,
    6) passing the suction tube being connected with a sufficient length extension tube 26 through the tube insertion aperture on the cover plate into the bottom side of the upper section of the storage canister, sucking the contaminants previously removed by the pneumatic needle brush tool,
    7) extending the suction tube of the multi-level filtration system through the suction tube insertion aperture on the cover plate to the bottom of the upper section of the storage canister 3 for cleaning airborne contamination in the storage canister,
    8) replacing the cover plate with the original sealing cover after contaminants removal is completed at the bottom side of the storage canister to avoid contamination spreading out,
    9) passing a second extension rod through the tool insertion aperture of the cover plate into the bottom side of the storage canister, and a vertical pneumatic sand wheel tool is fixed to the front end of the extension rod, then replacing the original sealing cover with the cover plate to mount on the storage canister,
    10) passing the suction tube of the multi-level filtration system through the suction tube insertion aperture on the cover plate into the bottom of the upper section of the storage canister for cleaning airborne contamination in the storage canister,
    11) starting the vertical pneumatic sand wheel tool and abrading in axial direction to remove pollutants adhered on the inner wall in the lower section of the storage canister, absorbing airborne pollutants with the suction tube of the multi-level filtration system at the same time, and collecting pollutants in the pre-filtration tank,
    12) after the work of abrading pollutants adhered on the wall of the storage canister is completed, moving out the vertical pneumatic sand wheel tool from the storage canister, and continuously absorbing airborne pollutants with the suction tube of the multi-level filtration system and collecting pollutants in the pre-filtration tank,
    13), connecting the suction tube of the multi-level filtration system to an extension tube with a sufficient length and extending into the bottom side of the lower section of the storage canister through a suction tube insertion aperture, sucking the previously removed pollutants by the vertical pneumatic sand wheel tool,
    14) using radiation detection equipment to detect radiation intensity inside the storage canister 3, if the result is negative "N", it means that after the decontamination operation the radiation dose is still exceeding a predetermined target value, then repeating the steps from step 9} again, and if the result is affirmative "Y", it means that after decontamination operation the radiation dose has met the predetermined target value, then proceeds to the next step, and 15) after the decontamination operation is completed and the radiation intensity detection is in compliance with the target value, then removing the cover plate and replaced with the original sealing cover to seal the opening of the storage canister.

2. The method of decontamination operation for a high activity nuclear waste polluted storage canister of claim 1, wherein the suction tube in the steps 4, 7, 10 is being extended into the bottom of the upper section of the storage canister, respectively.

3. The method of decontamination operation for a high activity nuclear waste polluted storage canister of claim 1, wherein the suction tube operation time is at least 10 minutes in the step.

4. The method of decontamination operation for a high activity nuclear waste polluted storage canister of claim 1, wherein in prior to assembling the vertical pneumatic sand wheel tool on the cover plate, it is required that the cover plate is replaced with the original sealing cover first to avoid spreading the pollutant out of the canister.

5. The method of decontamination operation for a high activity nuclear waste polluted storage canister of claim 1, wherein shielding the vertical pneumatic sand wheel tool is required when moving the vertical pneumatic sand wheel tool out of the storage canister is required to avoid pollutant spreading out.

6. The method of decontamination operation for a high activity nuclear waste polluted storage canister of claim 1, wherein shielding the pneumatic needle brush tool is required when moving the pneumatic needle brush tool out of the storage canister is required to avoid pollutant spreading out.

* * * * *